United States Patent
Tan

(10) Patent No.: US 12,501,029 B2
(45) Date of Patent: Dec. 16, 2025

(54) METHOD AND DEVICE FOR IMAGE ENCODING/DECODING BASED ON DEPENDENT RANDOM-ACCESS POINT PICTURE, AND METHOD FOR BITSTREAM TRANSMISSION

(71) Applicant: LG Electronics Inc., Seoul (KR)

(72) Inventor: Hendry Tan, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/985,591

(22) Filed: Dec. 18, 2024

(65) Prior Publication Data

US 2025/0126242 A1 Apr. 17, 2025

Related U.S. Application Data

(63) Continuation of application No. PCT/KR2023/013138, filed on Sep. 4, 2023.

(60) Provisional application No. 63/403,854, filed on Sep. 5, 2022.

(51) Int. Cl.
*H04N 19/105* (2014.01)
*H04N 19/172* (2014.01)
*H04N 19/70* (2014.01)

(52) U.S. Cl.
CPC ......... *H04N 19/105* (2014.11); *H04N 19/172* (2014.11); *H04N 19/70* (2014.11)

(58) Field of Classification Search
CPC .................................................. H04N 19/105
See application file for complete search history.

(56) References Cited

U.S. PATENT DOCUMENTS

2022/0103867 A1* 3/2022 Wang ............... H04N 19/70
2023/0308658 A1* 9/2023 Xu ................... H04N 19/103

FOREIGN PATENT DOCUMENTS

| KR | 10-2019-0126194 A | 11/2019 |
| KR | 10-2022-0037393 A | 3/2022 |
| KR | 10-2022-0043909 A | 4/2022 |
| KR | 10-2022-0114557 A | 8/2022 |
| WO | WO 2022/148269 A1 | 7/2022 |

OTHER PUBLICATIONS

International Search Report and Written Opinion in International Appln. No. PCT/KR2023/013138, mailed on Dec. 12, 2023, 10 pages (with partial English translation).

* cited by examiner

*Primary Examiner* — Jerry T Jean Baptiste
(74) *Attorney, Agent, or Firm* — Fish & Richardson P.C.

(57) ABSTRACT

A method and a device for image encoding/decoding are provided. An image decoding method according to the present disclosure may comprise the steps of: in response to a random-access request for a first picture, acquiring a second picture which is associated with the first picture and has been decoded before the first picture; and decoding the first picture by referring to the second picture, wherein the first picture is a dependent random-access point picture, and the second picture is gradual coding refresh (GDR) picture having a zero-recovery point picture.

12 Claims, 8 Drawing Sheets

METHOD AND DEVICE FOR IMAGE ENCODING/DECODING BASED ON DEPENDENT RANDOM-ACCESS POINT PICTURE, AND METHOD FOR BITSTREAM TRANSMISSION

CROSS-REFERENCE TO RELATED APPLICATIONS

Pursuant to 35 U.S.C. § 119 (e), this application is a continuation of International Application No. PCT/KR2023/013138, filed on Sep. 4, 2023, which claims the benefit of U.S. Provisional Application No. 63/403,854, filed on Sep. 5, 2022. The disclosures of the prior applications are incorporated by reference in their entirety.

TECHNICAL FIELD

The present disclosure relates to an image encoding/decoding method and a recording medium storing a bitstream, and, more particularly, to an image encoding/decoding method and apparatus based on a dependent random access point picture and a method of transmitting a bitstream generated by the image encoding method/apparatus of the present disclosure.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

In addition, an object of the present disclosure is to provide an image encoding/decoding method and apparatus based on a dependent random access point picture.

In addition, an object of the present disclosure is to provide an image encoding/decoding method and apparatus that performs random access to a dependent random access point picture based on a GDR picture having a zero recovery point picture.

In addition, an object of the present disclosure is to provide a non-transitory computer-readable recording medium storing a bitstream generated by an image encoding method or apparatus according to the present disclosure.

In addition, an object of the present disclosure is to provide a non-transitory computer-readable recording medium storing a bitstream received, decoded and used to reconstruct an image by an image decoding apparatus according to the present disclosure.

In addition, an object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

An image decoding method according to an aspect of the present disclosure may comprise, in response to a random access request for a first picture, obtaining a second picture associated with the first picture and decoded before the first picture and decoding the first picture by referring to the second picture. The first picture may be a dependent random access point (RAP) picture, and the second picture may be a gradual decoding refresh (GDR) picture having a zero recovery point picture.

An image decoding apparatus according to another aspect of the present disclosure may comprise a memory and at least one processor. The at least one processor may obtain, in response to a random access request for a first picture, a second picture associated with the first picture and decoded before the first picture and decode the first picture by referring to the second picture. The first picture may be a dependent random access point (RAP) picture, and the second picture may be a gradual decoding refresh (GDR) picture having a zero recovery point picture.

An image encoding method according to another aspect of the present disclosure may comprise deriving a second picture associated with a first picture that is a starting point of random access and encoding information about the first picture and the second picture. The first picture may be a dependent random access point (RAP) picture, and the second picture may be a gradual decoding refresh (GDR) picture having a zero recovery point picture.

A computer-readable recording medium according to another aspect of the present disclosure can store a bitstream generated by the image encoding method or the image encoding apparatus of the present disclosure.

A transmission method according to another aspect of the present disclosure may transmit a bitstream generated by the image encoding method or the image encoding apparatus of the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

Also, according to the present disclosure, it is possible to provide an image encoding/decoding method and apparatus based on a dependent random access point picture.

Also, according to the present disclosure, it is possible to provide an image encoding/decoding method and apparatus that performs random access to a dependent random access point picture based on a GDR picture having a zero recovery point picture.

Also, according to the present disclosure, it is possible to provide a non-transitory computer-readable recording medium storing a bitstream generated by an image encoding method or apparatus according to the present disclosure.

Also, according to the present disclosure, it is possible to provide a non-transitory computer-readable recording medium storing a bitstream received, decoded and used to reconstruct an image by an image decoding apparatus according to the present disclosure.

Also, according to the present disclosure, it is possible to provide a method of transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DETAILED DESCRIPTION

Figure 1:
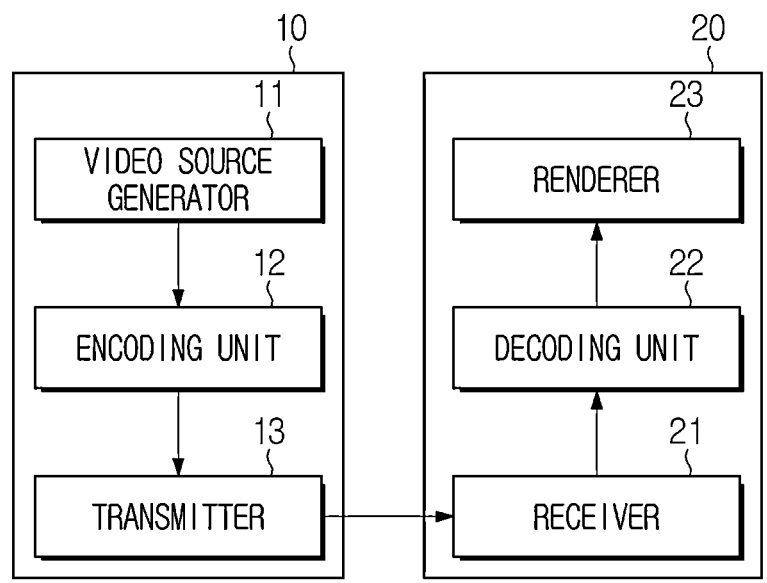
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "video" may mean a set of images over time.

In the present disclosure, "picture" generally means the basis representing one image in a particular time period, and a slice/tile is an encoding basis constituting a part of a picture. One picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

In the present disclosure, "at least one of A, B, and C" may mean "only A," "only B," "only C," or "any and all combinations of A, B, and C." In addition, "at least one A, B or C" or "at least one A, B and/or C" may mean "at least one A, B and C."

Parentheses used in the present disclosure may mean "for example." For example, if "prediction (intra prediction)" is indicated, "intra prediction" may be proposed as an example of "prediction." In other words, "prediction" in the present disclosure is not limited to "intra prediction," and "intra prediction" may be proposed as an example of "prediction." In addition, even when "prediction (i.e., intra prediction)" is indicated, "intra prediction" may be proposed as an example of "prediction."

Overview of Video Coding System

FIG. 1 is a view showing a video coding system to which an embodiment of the present disclosure is applicable.

The video coding system according to an embodiment may include an encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit (encoder) 12 and a transmitter 13. The decoding apparatus 20 according to an embodiment may include a receiver 21, a decoding unit (decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may forward the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
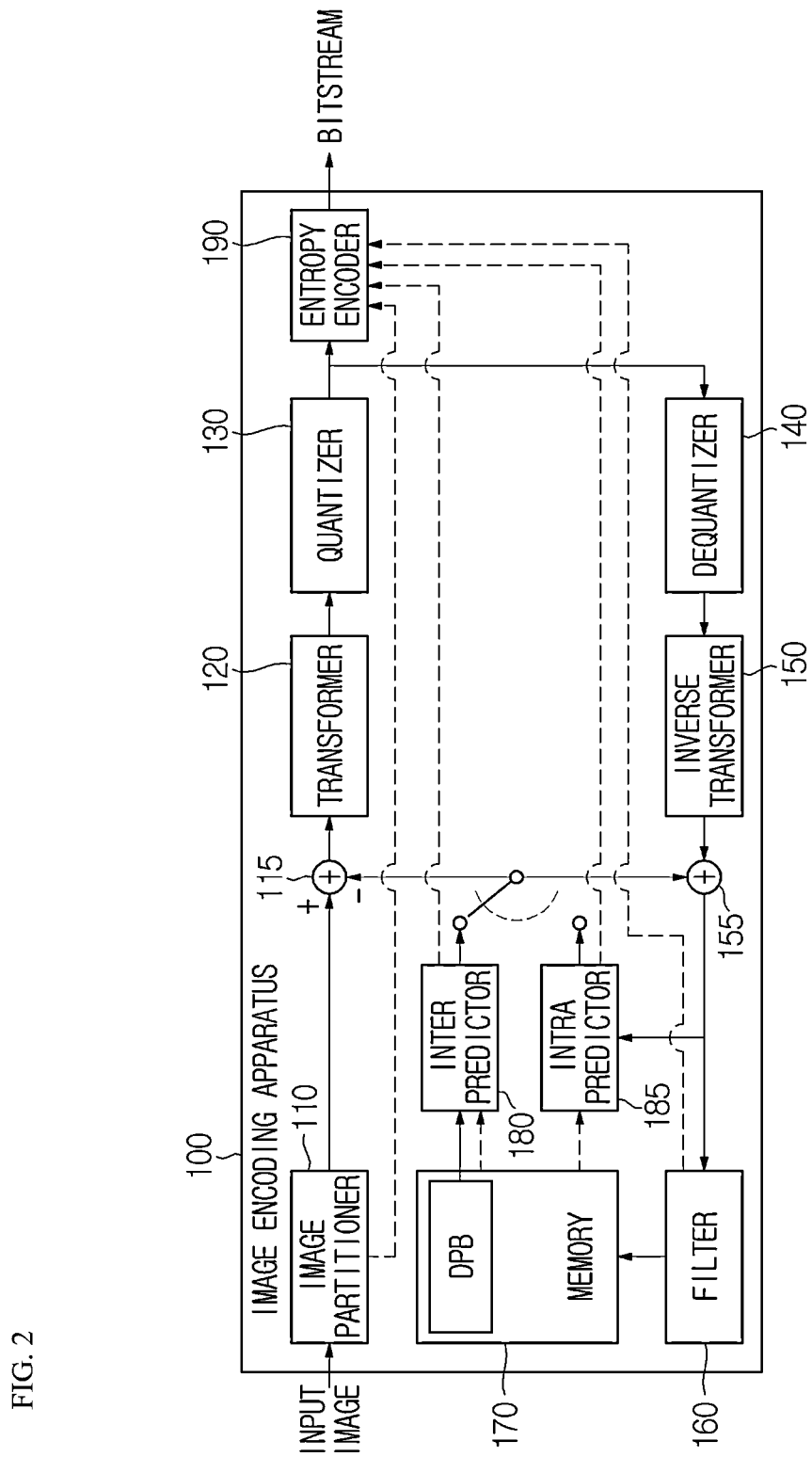
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit (intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit (inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may construct a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) is applicable in a picture encoding process and a reconstruction process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
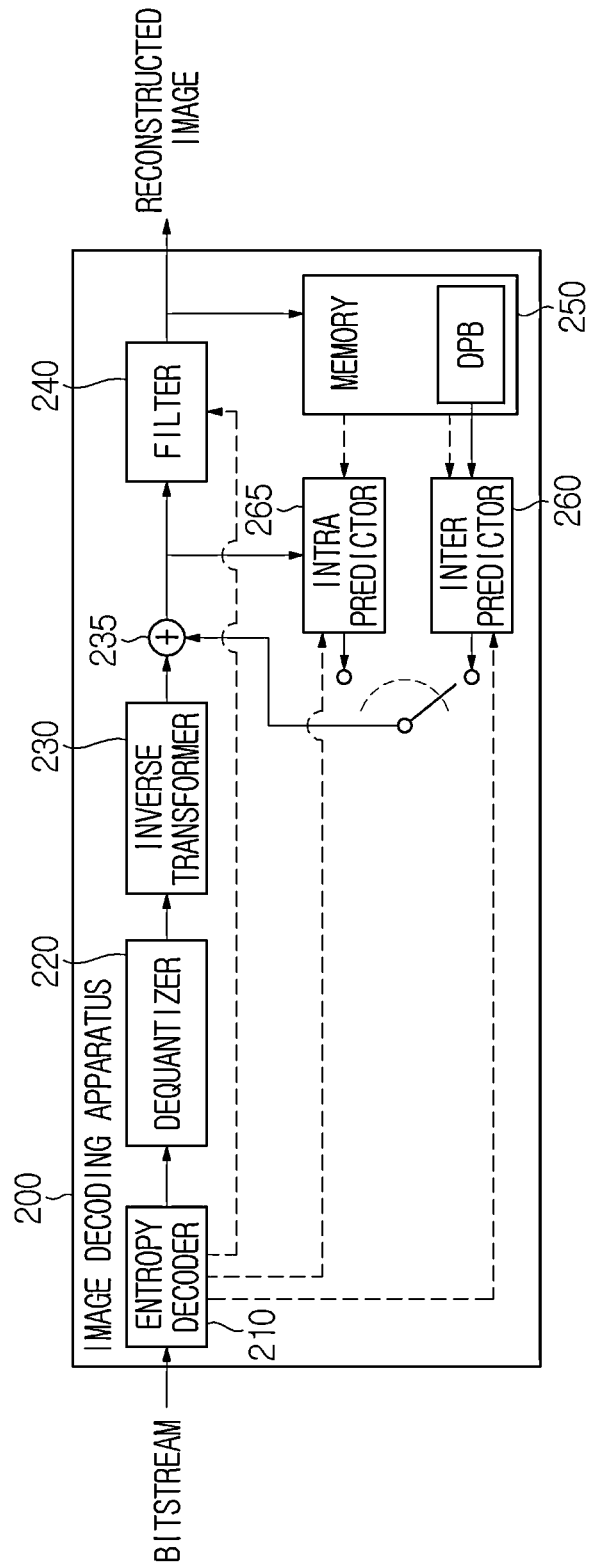
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra prediction unit 265. The inter predictor (inter prediction unit) 260 and the intra predictor (intra prediction unit) 265 may be collectively referred to as a "prediction unit (predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Meanwhile, the prediction unit of the above-described image encoding/decoding apparatus 100 or 200 may derive a reference sample according to the intra prediction mode of the current block among the neighboring reference samples of the current block, and generate a prediction sample of the current block based on the reference sample.

For example, a prediction sample may be derived based on an average or interpolation of neighboring reference samples of the current block, and (ii) the prediction sample may be derived based on a reference sample present in a specific (prediction) direction with respect to the prediction sample among the neighboring reference samples of the current block. The case of (i) may be called a non-directional mode or a non-angular mode, and the case of (ii) may be called a directional mode or an angular mode. Also, the prediction sample may be generated through interpolation of the second neighboring sample and the first neighboring sample positioned in the opposite direction of the prediction direction of the intra prediction mode of the current block based on the prediction sample of the current block among the neighboring reference samples. The above-described case may be referred to as linear interpolation intra prediction (LIP). In addition, a temporary prediction sample of the current block may be derived based on the filtered neighboring reference samples, and the prediction sample of the current block may be derived by a weighted sum of at least one reference sample derived according to the intra prediction mode among the existing neighboring reference samples, that is, unfiltered neighboring reference samples, and the temporary prediction sample. The above-described case may be referred to as position dependent intra prediction (PDPC). In addition, a reference sample line with the highest prediction accuracy is selected from among multiple neighboring reference sample lines of the current block to derive the prediction sample using the reference sample located in the prediction direction in the corresponding line, and, at this time, intra prediction encoding may be performed by indicating (signaling) the used reference sample line to the decoding apparatus. The above-described case may be referred to as multi-reference line (MRL) intra prediction or MRL-based intra prediction. In addition, intra prediction is performed based on the same intra prediction mode by partitioning the current block into vertical or horizontal sub-partitions, and neighboring reference samples may be derived and used in units of the sub-partitions. That is, in this case, the intra prediction mode for the current block is equally applied to the sub-partitions, but the intra prediction performance may be improved in some cases by deriving and using neighboring reference samples in units of sub-partitions. This prediction method may be called intra sub-partitions (ISP) or ISP-based intra prediction. The specific details will be described later. In addition, if the prediction direction based on the prediction sample indicates between the neighboring reference samples, that is, if the prediction direction indicates a fractional sample location, the value of the prediction sample may also be derived through interpolation of multiple reference samples located around the corresponding prediction direction (around the corresponding fractional sample location).

The above-described intra prediction methods may be called an intra prediction type to be distinguished from the intra prediction mode. The intra prediction type may be called various terms such as intra prediction technique or additional intra prediction mode. For example, the intra prediction type (or additional intra prediction mode, etc.) may include at least one of the aforementioned LIP, PDPC, MRL or ISP. Information about the intra prediction type may be encoded in the encoding apparatus, included in a bitstream, and signaled to the decoding apparatus. Information about the intra prediction type may be implemented in various forms, such as flag information indicating whether each intra prediction type is applied or index information indicating one of several intra prediction types.

Inter Prediction

The prediction unit of the image encoding apparatus 100 and the image decoding apparatus 200 may derive a prediction sample by performing inter prediction on a per-block basis. Inter prediction can be a prediction derived in a manner that is dependent on data elements (e.g., sample values or motion information) of picture(s) other than the current picture. When inter prediction is applied to a current block, a predicted block (a prediction sample array) for the current block may be derived on the basis of a reference block (a reference sample array) specified by a motion vector on a reference picture indicated by a reference picture index. Herein, in order to reduce the amount of motion information transmitted in the inter prediction mode, the motion information of the current block may be predicted on a per block, subblock, or sample basis on the basis of the correlation of motion information between a neighboring block and the current block. The motion information may include a motion vector and a reference picture index. The motion information may further include inter prediction type (L0 prediction, L1 prediction, Bi prediction, etc.) information. When inter prediction is applied, neighboring blocks may include a spatial neighboring block present in the current picture and a temporal neighboring block present in the reference picture. The reference picture including the reference block and the reference picture including the temporal neighboring block may be the same or different. The temporal neighboring block may be called a collocated reference block or a collocated CU (colCU). The reference picture including the temporal neighboring block may be called a collocated picture (colPic). For example, a motion information candidate list may be constructed on the basis of neighboring blocks of the current block. A flag or index information indicating which candidate is selected (used) to derive a motion vector and/or a reference picture index of the current block may be signaled. Inter prediction may be performed on the basis of various prediction modes. For example, in the case of a skip mode and a merge mode, motion information of a current block may be the same as motion information of a selected neighboring block. In the case of the skip mode, unlike the merge mode, the residual signal may not be transmitted. In the case of a motion information prediction (motion vector prediction, MVP) mode, a motion vector of a selected neighboring block may be used as a motion vector predictor, and a motion vector difference may be signaled. In this case, a motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be called an L0 motion vector or MVL0, and a motion vector in the L1 direction may be called an L1 motion vector or MVL1. The prediction based on the L0 motion vector may be called L0 prediction. The prediction based on the L1 motion vector may be called L1 prediction. The prediction based on both the L0 motion vector and the L1 motion vector may be called bi-prediction. Herein, the L0 motion vector may refer to a motion vector associated with a reference picture list L0 (L0), and the L1 motion vector may refer to a motion vector associated with a reference picture list L1 (L1). The reference picture list L0 may include, as reference pictures, pictures preceding the current picture in terms of output order. The reference picture list L1 may include pictures following the current picture in terms of output order. The preceding pictures may be called forward (reference) pictures, and the following pictures may be called backward (reference) pictures. The reference picture list L0 may further include, as reference pictures, pictures following the current picture in terms of output order. In this case, within the reference picture list L0, the preceding pictures may be indexed first, and the following pictures may be indexed next. The reference picture list L1 may further include, as reference pictures, pictures preceding the current picture in terms of output order. In this case, within the reference picture list1, the following pictures may be indexed first, and the preceding pictures may be indexed next. Herein, the output order may correspond to the picture order count (POC) order.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 4:
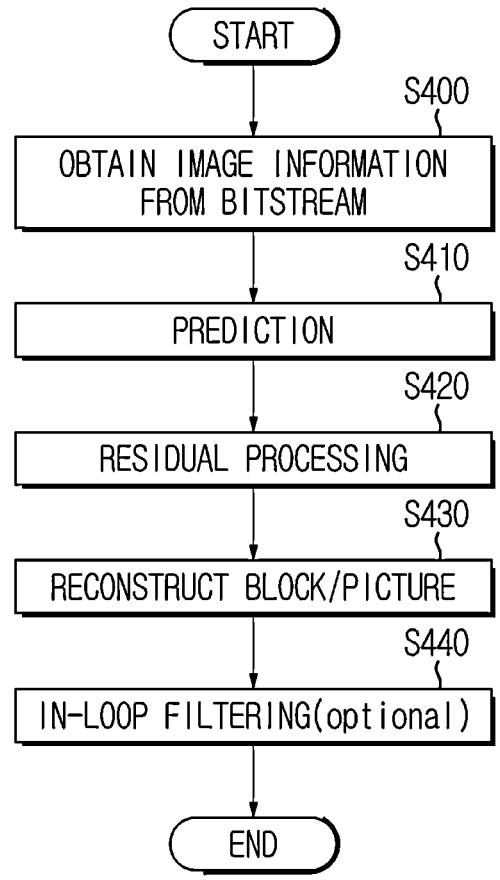
FIG. 4 illustrates an example of a schematic picture decoding procedure to which the embodiment(s) of the present disclosure are applicable.

FIG. 4 illustrates an example of a schematic picture decoding procedure, to which embodiments of the present disclosure is applicable. In FIG. 4, S400 may be performed in the entropy decoder 310 of the decoding apparatus, S410 may be performed in the prediction unit 310, S420 may be performed in the residual processor 320, S430 may be performed in the adder 340, and S440 may be performed in the filter 350. S400 may include the information decoding procedure described in the present disclosure, S410 may include the inter/intra prediction procedure described in the present disclosure, S420 may include a residual processing procedure described in the present disclosure, S430 may include the block/picture reconstruction procedure described in the present disclosure, and S440 may include the in-loop filtering procedure described in the present disclosure.

Referring to FIG. 4, the picture decoding procedure may schematically include a procedure (S400) for obtaining image/video information (through decoding) from a bitstream, a picture reconstruction procedure (S410 to S430) and an in-loop filtering procedure (S440) for a reconstructed picture. The picture reconstruction procedure may be performed based on prediction samples and residual samples obtained through inter/intra prediction (S410) and residual processing (S420) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 360 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 360 of the decoding apparatus, and used as a reference picture in the inter prediction procedure when decoding the picture later. The in-loop filtering procedure (S440) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 5:
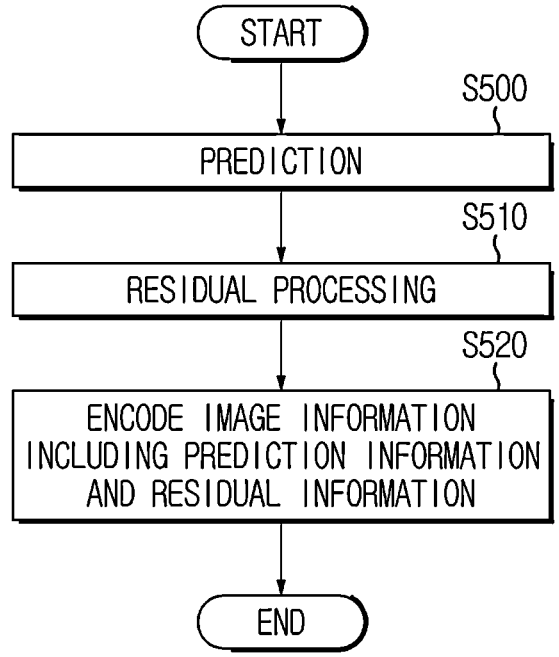
FIG. 5 illustrates an example of a schematic picture encoding procedure to which the embodiment(s) of the present disclosure are applicable.

FIG. 5 shows an example of a schematic picture encoding procedure, to which embodiments of the present disclosure is applicable. In FIG. 5, S500 may be performed in the prediction unit 220 of the encoding apparatus described above with reference to FIG. 2, S510 may be performed in the residual processor 230, and S520 may be performed in the entropy encoder 240. S500 may include the inter/intra prediction procedure described in the present disclosure, S510 may include the residual processing procedure described in the present disclosure, and S520 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture. The encoding apparatus may derive (modified) residual samples from a quantized transform coefficient through the dequantizer 234 and the inverse transformer 235, and generate the reconstructed picture based on the prediction samples which are output of S500 and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 270, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image of the present disclosure may be processed according to, for example, a coding layer and structure to be described later.

Figure 6:
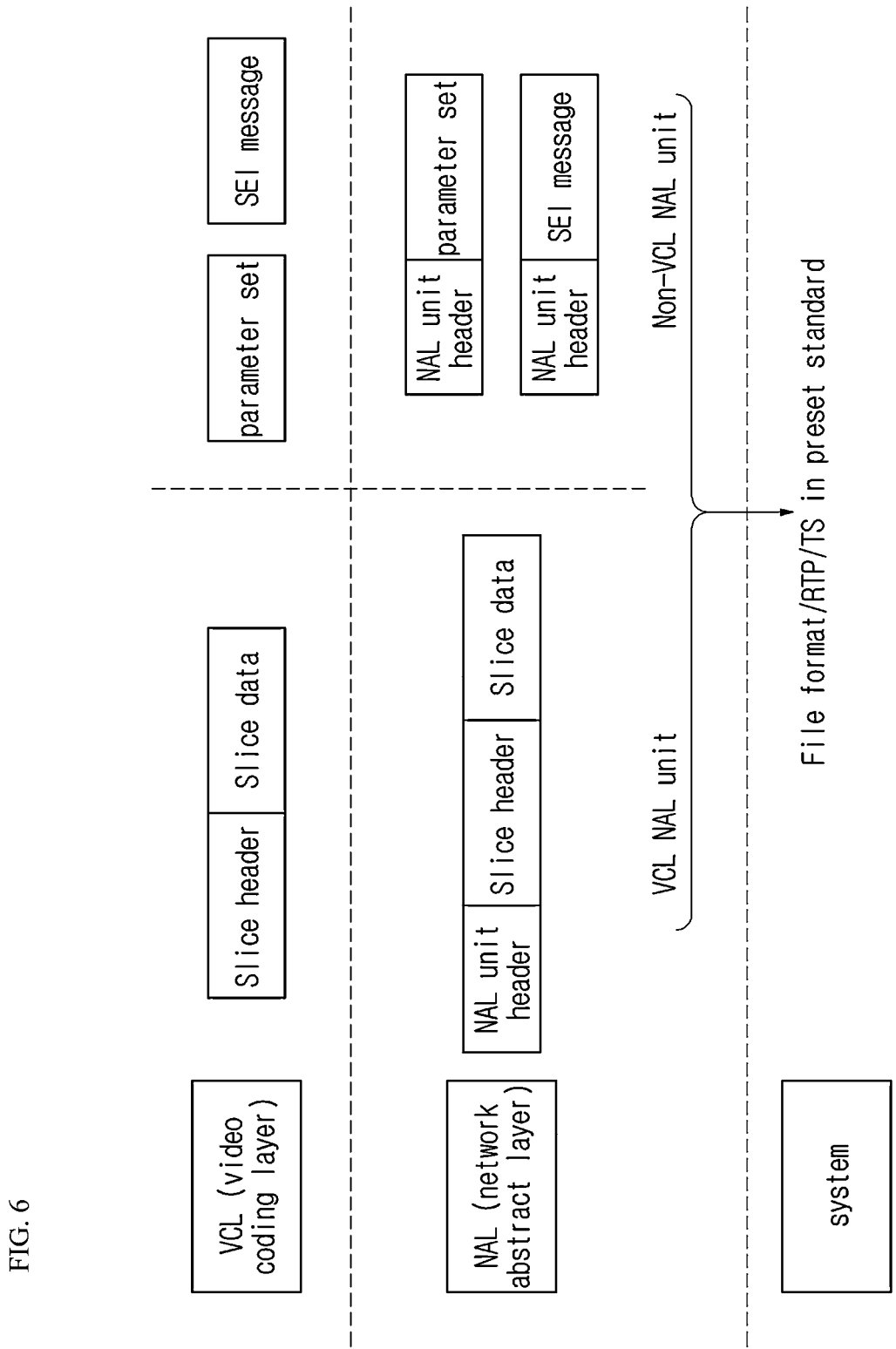
FIG. 6 is a diagram illustrating a hierarchical structure for a coded image.

FIG. 6 is a diagram illustrating a hierarchical structure for a coded image.

The coded image is classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a parameter set including information such as a picture parameter set (PPS), a sequence parameter set (SPS) or a video parameter set (VPS) or a supplemental enhancement information (SEI) message additionally required for a decoding process of an image may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 6, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data format of the lower system. For example, the NAL unit may be modified into data having a predetermined data format, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be broadly classified into a VCL NAL unit type and a non-VCL NAL unit type based on whether the NAL unit includes information on an image (slice data). The VCL NAL unit type may be classified according to a property and type of a picture, and the Non-VCL NAL unit type may be classified according to a type of a parameter set.

Examples of VCL NAL unit types according to picture type are as follows:

"IDR_W_RADL", "IDR_N_LP": VCL NAL unit types for IDR (Instantaneous Decoding Refresh) pictures, which are a type of IRAP (Intra Random Access Point) pictures "CRA_NUT": VCL NAL unit type for CRA (Clean Random Access) pictures, which are a type of IRAP pictures "GDR_NUT": VCL NAL unit type for GDR (Gradual Decoding Refresh) pictures that may be randomly accessed "STSA_NUT": VCL NAL unit type for STSA (Step-wise Temporal Sublayer Access) pictures that may be randomly accessed "RADL_NUT": VCL NAL unit type for RADL picture, which is a leading picture "RASL_NUT": VCL NAL unit type for RASL picture, which is a leading picture "TRAIL NUT": VCL NAL unit type for trailing picture. Trailing picture is a non-IRAP picture, and trailing pictures associated with IRAP or GDR picture follow the IRAP or GDR picture in decoding order. Trailing pictures that follow the associated IRAP picture in output order but precede it in decoding order are not allowed.

Next, examples of non-VCL NAL unit types according to parameter set type are as follows.

"DCI_NUT": non-VCL NAL unit type including DCI (Decoding capability information)

"VPS_NUT": non-VCL NAL unit type including VPS (Video Parameter Set)

"SPS_NUT": non-VCL NAL unit type including SPS (Sequence Parameter Set)

"PPS_NUT": non-VCL NAL unit type including PPS (Picture Parameter Set)

"PREFIX_APS_NUT", "SUFFIX_APS_NUT": non-VCL NAL unit type including APS (Adaptation Parameter Set)

"PH NUT": non-VCL NAL unit type including a picture header

The above-described NAL unit types may be identified by certain syntax information (e.g., nal_unit_type) included in the NAL unit header.

High Level Syntax

A coded picture may consist of one or more slices. Parameters describing a coded picture may be signaled in a picture header, and parameters describing a slice may be signaled in a slice header. A picture header is carried by a unique NAL unit type. In addition, a slice header is present at the beginning of a NAL unit containing the payload of a slice, i.e., slice data.

Table 1 is a diagram showing an example of a picture header.

TABLE 1

|  | Descriptor |
|---|---|
| picture_header_structure( ) { | |
| ph_gdr_or_irap_pic_flag | u(1) |
| ... | |
| if( ph_gdr_or_irap_pic_flag ) | |
| ph_gdr_pic_flag | u(1) |
| ... | |
| if( ph_gdr_pie_flag ) | |
| ph_recovery_poc_cnt | ue(v) |
| ... | |
| if( pps_rpl_info_in_ph_flag ) | |
| ref_pic_lists( ) | |
| ... | |
| } | |

Referring to Table 1, the picture header may include a syntax element ph_gdr_or_irap_pic_flag. The ph_gdr_or_irap_pic_flag may indicate whether a current picture is a GDR (Gradual Decoding Refresh) or IRAP (Intra Random Access Point) picture. For example, the ph_gdr_or_irap_pic_flag equal to a first value (e.g., 1) may indicate that the current picture is a GDR or IRAP picture. In contrast, the ph_gdr_or_irap_pic_flag equal to a second value (e.g., 0) may indicate that the current picture is not a GDR picture but may be an IRAP picture.

Additionally, the picture header may include a syntax element ph_gdr_pic_flag. The ph_gdr_pic_flag may indicate whether the current picture is a GDR picture. For example, a ph_gdr_pic_flag equal to a first value (e.g., 1) may indicate that the current picture is a GDR picture. Conversely, a ph_gdr_pic_flag equal to a second value (e.g., 0) may indicate that the current picture is not a GDR picture. When the ph_gdr_or_irap_pic_flag described above has a first value (e.g., 1) and the ph_gdr_pic_flag has a second value (e.g., 0), the current picture is determined to be an IRAP picture. Meanwhile, if ph_gdr_pic_flag is not present, the value of ph_gdr_pic_flag may be inferred to be a second value (e.g., 0).

In addition, the picture header may include a syntax element ph_recovery_poc_cnt. ph_recovery_poc_cnt may indicate a recovery point according to the output order of decoded pictures. i) If the current picture is a GDR picture and ii) ph_recovery_poc_cnt is 0, the current picture itself may be referred to as a recovery point picture. In contrast, if i) the current picture is a GDR picture and ii) there is a succeeding picture that follows the current picture in decoding order within the CLVS and has a POC value equal to the POC value of the recovery point picture, the succeeding picture may be referred to as the recovery point picture. Alternatively, the first picture in output order that has a POC value greater than the POC value of the recovery point picture within the CLVS may be referred to as the recovery point picture. The recovery point picture shall not precede the current GDR picture in decoding order. Pictures associated with the current GDR picture and having a POC value smaller than the POC value of the recovery point picture may be called recovering pictures of the GDR picture.

Meanwhile, based on the pps_rpl_info_in_ph_flag having a first value (e.g., 1), ref_pic_lists ( ) including reference picture list information may be called within the picture header. pps_rpl_info_in_ph_flag is signaled/obtained via a picture parameter set and may indicate the calling position of ref_pic_lists ( ) For example, pps_rpl_info_in_ph_flag equal to a first value (e.g., 1) may indicate that ref_pic_lists ( ) is called within the picture header but not within the slice header. In contrast, pps_rpl_info_in_ph_flag equal to a second value (e.g., 0) may indicate that ref_pic_lists ( ) is not called within the picture header, but may be called within the slice header.

Random Access and RAP Picture

Random access means that a decoding process for a bitstream starts at a point other than the starting point of the bitstream (i.e., the first picture in decoding order). A picture that may be the starting point of a random access is called a random access point (RAP) picture, and may include an intra random access point (IRAP) picture and a gradual decoding refresh (GDR) picture.

(1) IRAP Picture

An IRAP picture is a randomly accessible picture, and refers to a picture having a VCL NAL unit type within the range of IDR_W_RADL to CRA_NUT.

An IRAP picture may include an Instantaneous decoding refresh (IDR) picture and a Clean random access (CRA) picture. An IRAP picture may not use inter prediction based on reference pictures in the same layer during the decoding process. The first picture in a bitstream in decoding order may be an IRAP picture or a Gradual Decoding Refresh (GDR) picture. For a single-layer bitstream, if parameter sets that need to be referenced are available, even if no pictures preceding the IRAP picture in decoding order are decoded/referenced, the IRAP picture and all non-RASL (Random Access Skipped Leading) pictures following the IRAP picture in decoding order in a CLVS (coded layer video sequence) may be decoded correctly.

(2) CRA Picture

A CRA (Clean Random Access) picture is a type of IRAP picture, and refers to a picture having a VCL NAL unit type such as CRA_NUT.

A CRA picture may not use inter prediction during the decoding process. A CRA picture may be the first picture in a bitstream in decoding order, or may be the first or subsequent picture. A CRA picture may be associated with RADL or RASL pictures. If NoOutputBeforeRecoveryFlag has a first value (e.g., 1) for a CRA picture, RASL pictures associated with the CRA picture may not be decoded because they refer to pictures that are not present in the bitstream, and as a result, they may not be output by an image decoding apparatus. Here, NoOutputBeforeRecoveryFlag may indicate whether pictures preceding a recovery point picture in decoding order are output before the recovery point picture. For example, NoOutputBeforeRecoveryFlag having a first value (e.g., 1) may indicate that pictures preceding a recovery point picture in decoding order cannot be output before the recovery point picture. In this case, a CRA picture may be the first picture in a bitstream or the first picture following an EOS (End Of Sequence) NAL unit in decoding order, which may mean that random access has occurred. In contrast, NoOutputBeforeRecoveryFlag having a second value (e.g., 0) may indicate that pictures preceding a recovery point picture in decoding order may be output before the recovery point picture. In this case, a CRA picture may not be the first picture in a bitstream or the first picture following an EOS NAL unit in decoding order, which may mean that random access has not occurred.

(3) IDR Picture

An IDR (Instantaneous Decoding Refresh) picture is a type of IRAP picture, and refers to a picture having a VCL NAL unit type such as IDR_W_RADL or IDR_N_LP.

An IDR picture may not use inter prediction during the decoding process. An IDR picture may be the first picture in a bitstream in decoding order, or may be the first or subsequent picture. Each IDR picture may be the first picture of a CVS (coded video sequence) in decoding order. If each VCL NAL unit for an IDR picture has a NAL unit type such as IDR_W_RADL, the IDR picture may have associated RADL pictures. On the other hand, if each VCL NAL unit for an IDR picture has a NAL unit type such as IDR_N_LP, the IDR picture may not have associated leading pictures. Meanwhile, an IDR picture may not have associated RASL pictures.

(4) GDR Picture

A GDR (Gradual Decoding Refresh) picture is a randomly accessible picture, and refers to a picture having a VCL NAL unit type such as GDR_NUT.

The GDR function means that when a decoding process starts from a picture in which all parts of the reconstructed picture may not be decoded correctly, the correctly decoded parts of the reconstructed picture gradually increase in the pictures following the picture until the whole picture is decoded correctly. A picture having this GDR function is called a GDR picture, and the first picture among the pictures following the GDR picture in which the whole picture may be correctly decoded is called a recovery point picture.

A GDR picture may include a refreshed area and a dirty area. The refreshed area refers to an area having an exact matching of decoded sample values when the decoding process starts from a GDR picture, compared to a case where the decoding process starts from a previous IRAP picture in decoding order. The refreshed area may include blocks coded using intra prediction and may be decoded without referring to other picture(s). In contrast, the dirty area refers to an area not having an exact matching of decoded sample values when the decoding process starts from a GDR picture, compared to a case where the decoding process starts from a previous IRAP picture in decoding order. The dirty area may include blocks coded using inter prediction and may not be decoded without referring to other picture(s). As a result, the dirty area is decodable only when the corresponding GDR picture is not a starting point of random access.

Meanwhile, unlike the IRAP picture described above, the RAP picture may further include DRAP (Dependent Random Access Point) and EDRAP (extended DRAP) pictures that cannot be decoded independently.

DRAP and EDRAP pictures refer to pictures that cannot be decoded correctly without referring to other picture(s), but may be the starting point of random access. A DRAP picture may be decoded correctly if it may refer to the closest picture preceding the DRAP picture in decoding order. On the other hand, an EDRAP picture may be decoded correctly if it may refer to the closest picture preceding the EDRAP picture in decoding order and one or more other identified EDRAP pictures preceding the EDRAP picture in decoding order. DRAP and EDRAP pictures may be encoded and represented using significantly fewer bits than other RAP pictures, especially IRAP pictures, which has the advantage of increasing the total number of RAPs while maintaining the overall bit rate.

Information about a DRAP picture may be signaled via a DRAP indication SEI message specified in the Versatile Supplemental Enhancement Information (VSEI) specification. In addition, information about an EDRAP picture may be signaled via an EDRAP indication SEI message specified in the VSEI specification. Conversely, a picture associated with a DRAP indication SEI message is called a DRAP picture, and a picture associated with an EDRAP indication SEI message is called an EDRAP picture.

The DRAP or EDRAP picture indicated by the SEI messages may be associated with an anchor picture, which is an actual independent picture for random access. In the current design, the anchor picture includes only an IRAP picture, called an associated IRAP (intra random access point) picture. The basic idea of the current design is that random access from the DRAP picture is possible as long as the associated IRAP picture is provided and decoded before decoding the DRAP picture. In this case, no other pictures (i.e., pictures between the associated IRAP picture and the DRAP picture) are required for random access from the DRAP picture. This concept may be similarly applied to EDRAP pictures, when adding that an EDRAP picture may further reference zero or more previous EDRAP pictures.

As described above, according to the current design, only IRAP pictures are designated and used as anchor pictures for DRAP and EDRAP pictures. However, a GDR picture with a zero recovery point picture (e.g., a GDR picture with ph_recovery_poc_cnt equal to 0) may also be a random access point and may be decoded correctly without referring to other pictures. In this regard, the current design that uses only IRAP pictures as associated pictures has a problem that it cannot utilize all other types of pictures that may perform as actual anchor pictures.

In order to solve this problem, the following aspects regarding DRAP and EDRAP pictures may be provided according to the present disclosure.

(Aspect 1): For DRAP and EDRAP pictures, an anchor picture associated with the DRAP and/or EDRAP pictures may be defined. Here, the anchor picture means a picture from which random access may be performed and which may be correctly decoded without referring to other pictures.

(Aspect 2): A list of pictures that may be used/considered as anchor pictures for DRAP and/or EDRAP pictures may include the following.
  a. IRAP picture
  b. IRAP-like picture. Here, an IRAP-like picture means a picture that is not an existing IRAP picture, but from which random access may be performed. An example of such a picture is a GDR (Gradual Decoding Refresh) picture having a zero recovery point picture (i.e., a GDR picture having ph_recovery_poc_cnt equal to 0 in the H.266/VVC standard).

Embodiments of the present disclosure may be provided based on the above aspects. Depending on the embodiment, the above configurations may be applied individually or in a combination of two or more. Hereinafter, embodiments of the present disclosure will be described in detail.

1. DRAP Picture

According to embodiments of the present disclosure, in order to support random access from a DRAP picture, an anchor picture associated with a DRAP picture may be newly defined. In addition, the DRAP picture may be correctly decoded by referring to the associated anchor picture when random access occurs.

In one embodiment, the associated anchor picture of a DRAP picture may be a GDR picture having a zero recovery point picture. In other words, an IRAP picture associated with an existing DRAP picture may be newly defined as a GDR picture having a zero recovery point picture.

Information about a DRAP picture may be signaled via a DRAP indication SEI message. The DRAP indication SEI message may have a form as shown in Table 2, for example.

TABLE 2

| | Descriptor |
|---|---|
| dependent_rap_indication( payloadSize ) {<br>} | |

The presence of a DRAP indication SEI message indicates that certain constraints on picture order and picture referencing apply. These constraints allow a decoder to properly decode a DRAP picture and pictures that are within the same layer and that follow the DRAP picture in both decoding order and output order, without having to decode any other pictures within the same layer, except for the associated anchor picture of the DRAP picture.

The associated anchor picture for a DRAP picture shall be one of the following pictures:
An associated IRAP picture of the DRAP picture.
An associated GDR picture of the DRAP picture, having ph_recovery_poc_cnt equal to 0. This means that the GDR picture itself is a recovery point picture.

Meanwhile, all constraints indicated by the presence of the DRAP indication SEI message shall apply, as follows:
A DRAP picture is a trailing picture.
A DRAP picture has a temporal sublayer identifier equal to 0.
A DRAP picture does not contain any other pictures of the same layer, except for the associated anchor picture of the DRAP picture, in the active entries of its reference picture lists.
All pictures that are present in the same layer and that follow the DRAP picture in both decoding order and output order do not include any pictures that belong to the same layer and that precede the DRAP picture in both decoding order and output order, except for the associated anchor picture of the DRAP picture, in the active entries of the reference picture lists.

Figure 7:
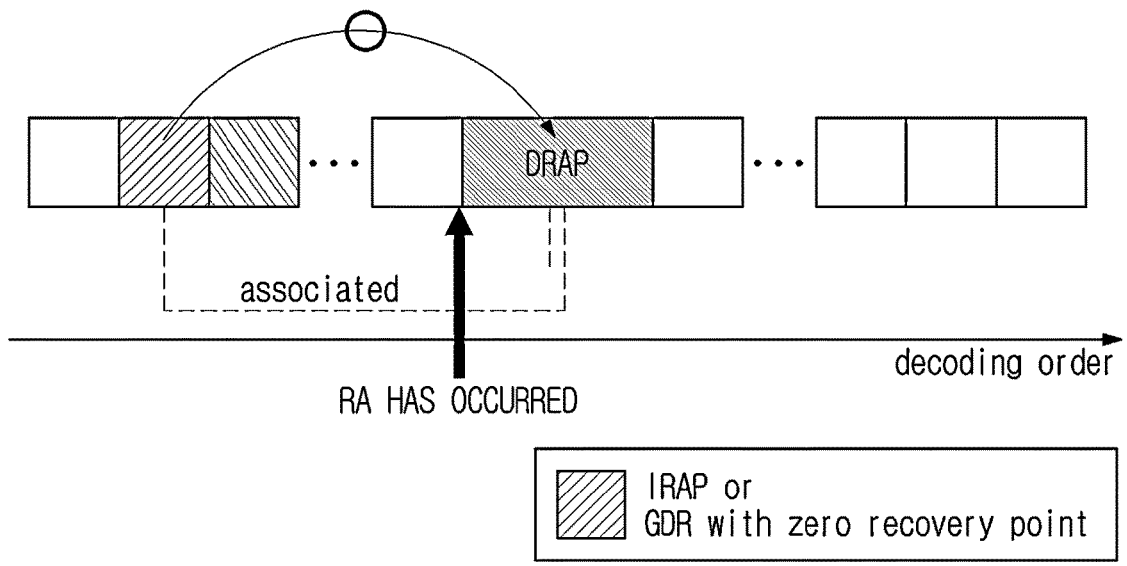
FIG. 7 is a diagram for explaining a decoding process of a DRAP picture according to an embodiment of the present disclosure.

As described above, according to the embodiments of the present disclosure, when random access occurs from a DRAP picture, a GDR picture having a zero recovery point picture may be used as an anchor picture associated with the DRAP picture. In this case, when random access occurs to the DRAP picture, the DRAP picture may be correctly decoded by referring to the GDR picture having a zero recovery point picture, as illustrated in FIG. 7.

2. EDRAP Picture

According to embodiments of the present disclosure, in order to support random access from an EDRAP picture, an anchor picture associated with the EDRAP picture may be newly defined. Then, the EDRAP picture may be correctly decoded by referring to the associated anchor picture and a previous EDRAP picture preceding it in decoding order when random access occurs.

In one embodiment, the associated anchor picture of the EDRAP picture may be a GDR picture having a zero recovery point picture. In other words, an IRAP picture associated with an existing EDRAP picture may be newly defined as a GDR picture having a zero recovery point picture.

Information about an EDRAP picture may be signaled via an EDRAP indication SEI message. The presence of an EDRAP indication SEI message indicates that certain constraints on picture order and picture referencing apply. These constraints allow a decoder to properly decode an EDRAP picture and pictures that are within the same layer and that follow the EDRAP picture both in decoding order and in output order, without having to decode any other pictures within the same layer, except for a list of referrable pictures. Here, the list of referrable pictures consists of associated anchor pictures or EDRAP pictures that belong to the same CLVS as the EDRAP picture and are indicated by edrap_ref_rap_id[i] syntax elements.

The associated anchor picture for an EDRAP picture shall be one of the following pictures:
An associated IRAP picture of the EDRAP picture.
An associated GDR picture of the EDRAP picture, having ph_recovery_poc_cnt equal to 0. This means that the GDR picture is itself a recovery point picture.

Meanwhile, all constraints indicated by the presence of the EDRAP indication SEI message shall apply, as follows:
An EDRAP picture is a trailing picture.
An EDRAP picture has a temporal sublayer identifier equal to 0.
An EDRAP picture does not include any other pictures of the same layer, except for referrable pictures, in the active entries of its reference picture lists.
All pictures that are present in the same layer and that follow the EDRAP picture in both decoding order and output order do not include any pictures that belong to the same layer and precede the EDRAP picture in both decoding order and output order, except for referrable pictures, in the active entries of its reference picture lists.
No picture in the list of referrable pictures includes any picture that is not a picture belonging to the same layer and being present at an earlier position in the list of referrable pictures, in the active entries of the reference picture lists. Consequently, the first picture in the list of referrable pictures does not include any picture of the same layer in the active entries of the reference picture lists, even if it is an EDRAP picture that is not an anchor picture.

An example of the EDRAP indication SEI message is shown in Table 3.

TABLE 3

| | Descriptor |
|---|---|
| extended_drap_indication( payloadSize ) {<br>  edrap_rap_id_minus1<br>  edrap_leading_pictures_decodable_flag<br>  edrap_reserved_zero_12bits<br>  edrap_num_ref_rap_pics_minus1<br>  for( i= 0; i <= edrap_num_ref_rap_pics_minus1; i++ )<br>    edrap_ref_rap_id[ i ]<br>} | <br>u(16)<br>u(1)<br>u(12)<br>u(3)<br><br>u(16) |

Referring to Table 3, the EDRAP indication SEI message extended_drap_indication ( ) may include syntax elements edrap_rap_id_minus1, edrap_leading_pictures_decodable_flag, edrap_reserved_zero_12bits, edrap_num_ref_rap_pics_minus1, and edrap_ref_rap_id [i].

edrap_rap_id_minus1 plus 1 may represent a RAP picture identifier, which is denoted as RapPicId of an EDRAP picture. Each anchor picture or EDRAP picture may be associated with a RapPicId value. The RapPicId value for an anchor picture may be inferred to be 0. The RapPicId values for two EDRAP pictures associated with the same anchor picture shall be different.

edrap_leading_pictures_decodable_flag may indicate whether certain constraints apply. Specifically, edrap_leading_pictures_decodable_flag equal to 1 may indicate that all of the following constraints apply:

- All pictures belonging to the same layer and following an EDRAP picture in decoding order shall follow in output order any picture that belongs to the same layer and precedes the EDRAP picture in decoding order.
- All pictures belonging to the same layer and following an EDRAP picture in decoding order and preceding the EDRAP picture in output order shall not include, in the active entries of its reference picture lists, any picture belonging to the same layer and preceding the EDRAP picture in decoding order, except for referrable pictures.

In contrast, an edrap_leading_pictures_decodable_flag equal to 0 may indicate that the constraints do not apply.

edrap_reserved_zero_12bits shall be equal to 0 in bitstreams conforming to video codec standards, such as the H.266/VVC standard. Other values of edrap_reserved_zero_12bits are reserved for future use, and the decoder shall ignore edrap_reserved_zero_12bits values.

edrap_num_ref_rap_pics_minus1 plus 1 may indicate the number of anchor or EDRAP pictures that belong to the same CLVS as the EDRAP picture and may be included in the active entries of the reference picture lists of the EDRAP picture.

edrap_ref_rap_id [i] may indicate the RapPicId of the i-th RAP picture, which may be included in the active entries of the reference picture lists of the EDRAP picture. The i-th RAP picture shall be an anchor picture associated with the current EDRAP picture or an EDRAP picture associated with the same IRAP picture as the current EDRAP picture.

Figure 8:
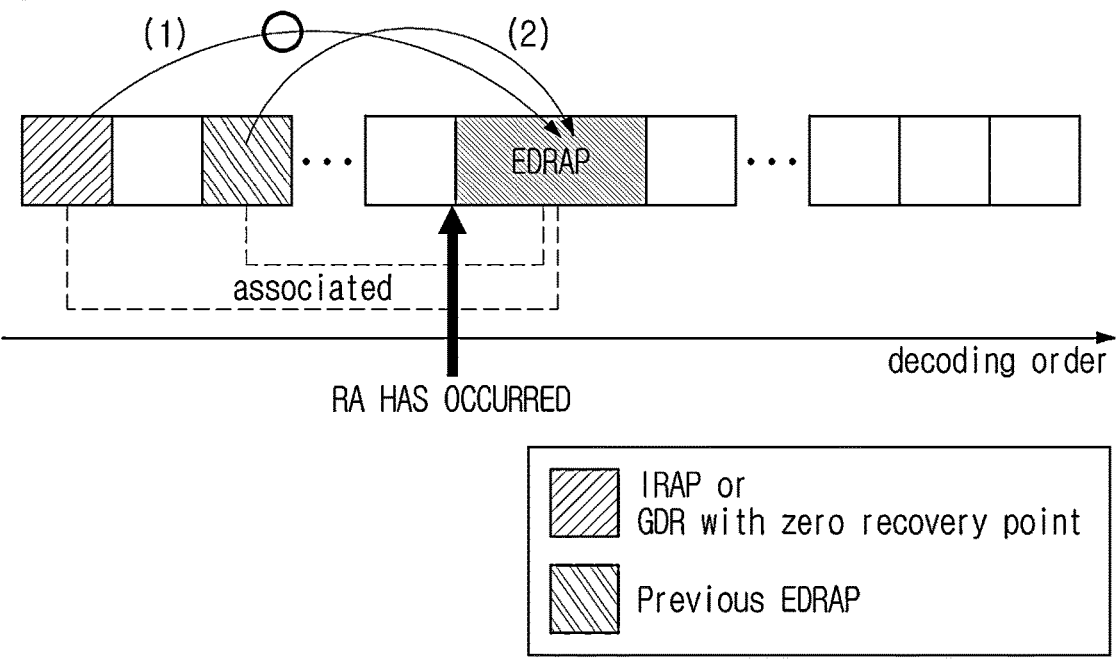
FIG. 8 is a diagram for explaining a decoding process of an EDRAP picture according to an embodiment of the present disclosure.

As described above, when random access occurs from an EDRAP picture, a GDR picture having a zero recovery point picture may be used as an anchor picture associated with the EDRAP picture. In this case, when random access occurs to the EDRAP picture, the EDRAP picture may be correctly decoded by referring to another EDRAP picture preceding the GDR picture having the zero recovery point picture in decoding order, as illustrated in FIG. 8.

Above, according to the embodiments of the present disclosure, an anchor picture may be newly defined as an associated picture of DRAP and EDRAP pictures. An anchor picture means a picture that may be correctly decoded without having to decode any other pictures preceding it in decoding order within the same layer, and may be a GDR picture having a zero recovery point picture. That is, a GDR picture that is a recovery point picture itself may be newly defined as an IRAP picture associated with a DRAP picture. Accordingly, a GDR picture that may exhibit performance as an actual anchor picture may be used in random access, thereby enabling more flexible and extended random access support.

Hereinafter, with reference to FIGS. 9 and 10, an image encoding/decoding method according to an embodiment of the present disclosure will be described in detail.

Figure 9:
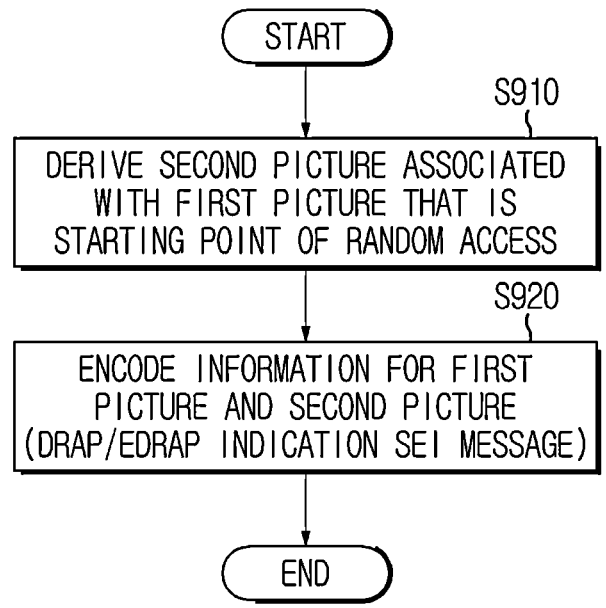
FIG. 9 is a flowchart illustrating an image encoding method according to an embodiment of the present disclosure.

FIG. 9 is a flowchart illustrating an image encoding method according to an embodiment of the present disclosure. The image encoding method of FIG. 9 may be performed by the image encoding apparatus of FIG. 2.

Referring to FIG. 9, the image encoding apparatus may derive a second picture associated with a first picture that is a starting point of random access (S910). Then, the image encoding apparatus may encode information about the first picture and the second picture (S920). Here, the first picture may be a dependent random access point picture, and the second picture may be a GDR (Gradual Decoding Refresh) picture having a zero recovery point picture.

In one embodiment, the first picture may be a Dependent Random Access Point (DRAP) picture or an extended DRAP (EDRAP) picture.

In one embodiment, when the first picture is a Dependent Random Access Point (DRAP) picture, active entries of reference picture lists for the first picture may not include any other pictures in the same layer except for the GDR picture having the zero recovery point picture.

In one embodiment, when the first picture is an extended DRAP (EDRAP) picture, a Random Access Point (RAP) picture identifier indicating the second picture may be encoded in a supplemental enhancement information (SEI) message.

In one embodiment, for the GDR picture having the zero recovery point picture, the RAP picture identifier value may be determined to be 0.

A bitstream generated by the above-described image encoding method may be stored in a non-transitory computer-readable recording medium and transmitted to an image decoding apparatus.

Figure 10:
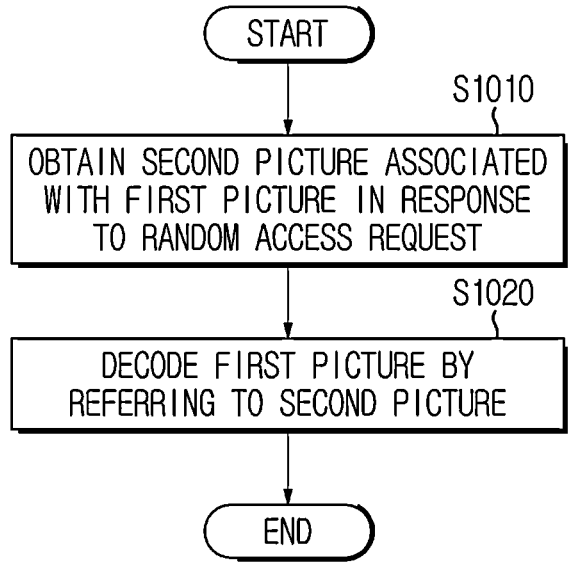
FIG. 10 is a flowchart illustrating an image decoding method according to an embodiment of the present disclosure.

FIG. 10 is a flowchart illustrating an image decoding method according to an embodiment of the present disclosure. The image decoding method of FIG. 10 may be performed by the image decoding apparatus of FIG. 3.

Referring to FIG. 10, in response to a random access request for a first picture, the image decoding apparatus may obtain a second picture associated with the first picture and decoded before the first picture (S1010). Then, the image decoding apparatus may decode the first picture by referring to the second picture (S1020). Here, the first picture may be a dependent Random Access Point picture, and the second picture may be a GDR (Gradual Decoding Refresh) picture having a zero recovery point picture.

In one embodiment, the first picture may be a Dependent Random Access Point (DRAP) picture or an extended DRAP (EDRAP) picture.

In one embodiment, if the first picture is a Dependent Random Access Point (DRAP) picture, active entries of reference picture lists for the first picture may not include any other pictures in the same layer except for the GDR picture having the zero recovery point picture.

In one embodiment, if the first picture is an extended DRAP (EDRAP) picture, the second picture may be identified based on a Random Access Point (RAP) picture identifier obtained from a supplemental enhancement information (SEI) message.

In one embodiment, the RAP picture identifier value for the GDR picture having the zero recovery point picture may be determined to be 0.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 11:
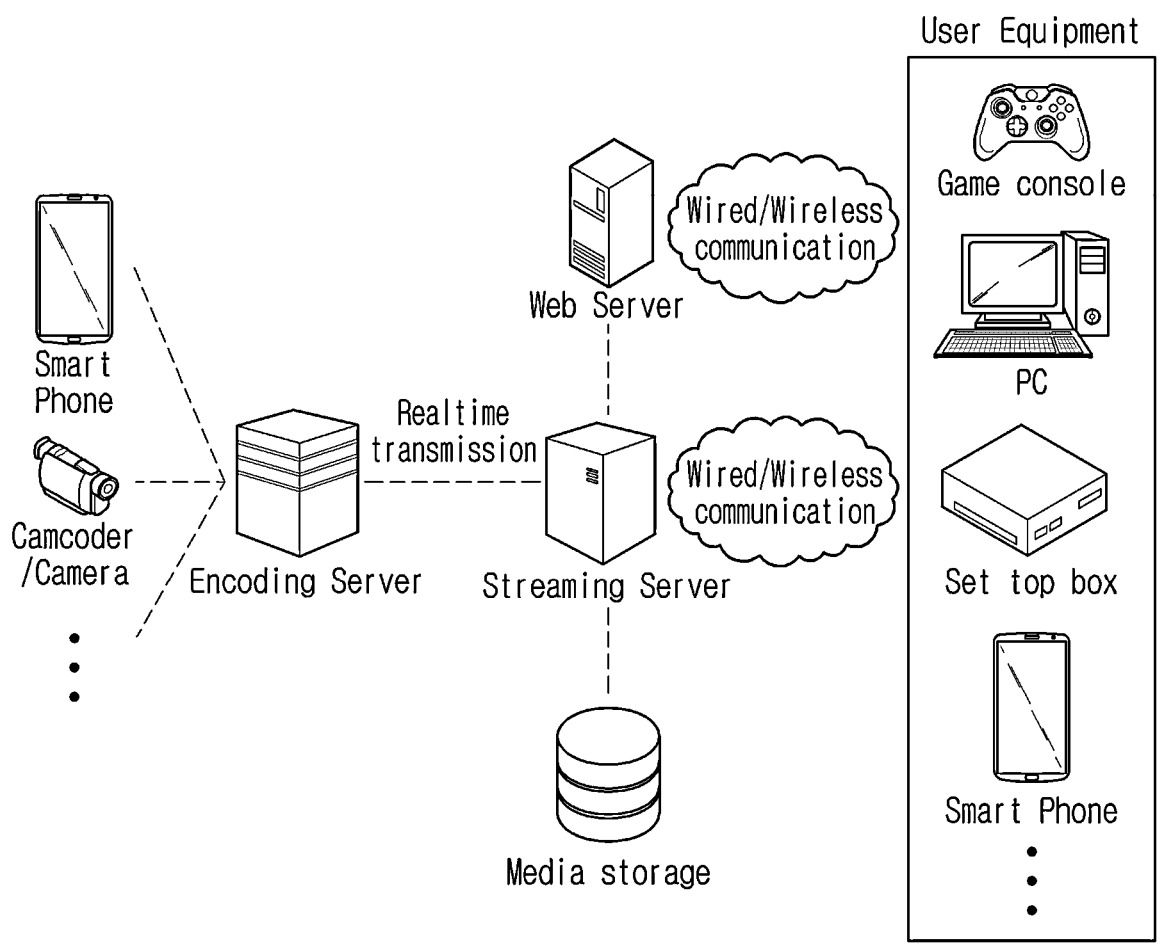
FIG. 11 is a view showing a content streaming system to which an embodiment of the present disclosure is applicable.

FIG. 11 is a view showing a content streaming system, to which an embodiment of the present disclosure is applicable.

As shown in FIG. 11, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode an image.

What is claimed is:

1. An image decoding method performed by an image decoding apparatus, the image decoding method comprising:
   obtaining a picture header recovery count flag from a bitstream; and
   decoding a DRAP (Dependent Random Access Point) picture associated with a GDR (Gradual Decoding Refresh) picture,
   wherein the GDR picture is referred to as a recovery point picture based on the picture header recovery count flag being equal to 0; and
   wherein the picture header recovery count flag specifies a recovery point of decoded pictures.

2. The image decoding method of claim 1, the method further comprising:
   obtaining an extended DRAP (EDRAP) picture.

3. The image decoding method of claim 1, wherein based on the first DRAP picture, active entries of reference picture lists for the DRAP picture do not include any other pictures in the same layer except for the GDR picture having the zero recovery point picture.

4. The image decoding method of claim 2, wherein based on the EDRAP picture, the GDR picture is identified based on a random access point (RAP) picture identifier obtained from a supplemental enhancement information (SEI) message associated with the GDR picture.

5. The image decoding method of claim 4, wherein a RAP picture identifier value for the GDR picture having the zero recovery point picture is determined to be 0.

6. An image encoding method performed by an image encoding apparatus, the image encoding method comprising:
   deriving a picture header recovery count flag in a bitstream; and
   encoding a DRAP (Dependent Random Access Point) picture associated with a GDR (Gradual Decoding Refresh) picture,
   wherein the GDR picture is referred to as a recovery point picture based on the picture header recovery count flag being equal to 0; and wherein the picture header recovery count flag specifies a recovery point of decoded pictures.

7. The image encoding method of claim 6, the method further comprising:
deriving an extended DRAP (EDRAP) picture.

8. The image encoding method of claim 6, wherein based on the DRAP picture, active entries of reference picture lists for the DRAP picture do not include any other pictures in the same layer except for the GDR picture having the zero recovery point picture.

9. The image encoding method of claim 7, wherein based on the EDRAP picture, a random access point (RAP) picture identifier indicating the GDR picture is encoded in a supplemental enhancement information (SEI) message associated with the GDR picture.

10. The image encoding method of claim 9, wherein for the GDR picture having the zero recovery point picture, a RAP picture identifier value is determined to be 0.

11. A non-transitory computer-readable recording medium storing a bitstream generated by the image encoding method of claim 6.

12. A method of transmitting a bitstream generated by an image encoding method, the image encoding method comprising:
deriving a picture header recovery count flag in a bitstream; and
encoding a DRAP (Dependent Random Access Point) picture associated with a GDR (Gradual Decoding Refresh) picture,
wherein the GDR picture is referred to as a recovery point picture based on the picture header recovery count flag being equal to 0; and
wherein the picture header recovery count flag specifies a recovery point of decoded pictures.

* * * * *